(12) United States Patent
Peters

(10) Patent No.: US 11,346,692 B2
(45) Date of Patent: May 31, 2022

(54) DETECTION UNIT FOR A ROTATING MEASURING BALL, AS WELL AS FLOWMETER

(71) Applicant: Marcel Leonardus Josephus Petrus Peters, Elst (NL)

(72) Inventor: Marcel Leonardus Josephus Petrus Peters, Elst (NL)

( * ) Notice: Subject to any disclaimer, the term of this patent is extended or adjusted under 35 U.S.C. 154(b) by 490 days.

(21) Appl. No.: 16/334,235

(22) PCT Filed: Sep. 15, 2017

(86) PCT No.: PCT/NL2017/050606
§ 371 (c)(1),
(2) Date: Mar. 18, 2019

(87) PCT Pub. No.: WO2018/052293
PCT Pub. Date: Mar. 22, 2018

(65) Prior Publication Data
US 2019/0226887 A1 Jul. 25, 2019

(30) Foreign Application Priority Data
Sep. 16, 2016 (NL) .................................... 2017477

(51) Int. Cl.
*G01F 1/05* (2006.01)
*G01F 15/14* (2006.01)
*G01F 15/18* (2006.01)

(52) U.S. Cl.
CPC ................ *G01F 1/056* (2013.01); *G01F 1/05* (2013.01); *G01F 15/14* (2013.01); *G01F 15/18* (2013.01); *G01F 15/185* (2013.01)

(58) Field of Classification Search
CPC . G01F 1/056; G01F 15/18; G01F 1/05; G01F 15/14; G01F 15/185
(Continued)

(56) References Cited

U.S. PATENT DOCUMENTS 3,861,210 A * 1/1975 Griverus .................... G01P 5/02
73/861.32
4,782,707 A 11/1988 Yamazaki et al.
(Continued)

FOREIGN PATENT DOCUMENTS

CN 201 397 161 Y 2/2010
EP 0 070 152 A1 1/1983
(Continued)

OTHER PUBLICATIONS

International Search Report, dated Feb. 21, 2018, from corresponding PCT/NL2017/050606 application.

*Primary Examiner* — Marrit Eyassu
(74) *Attorney, Agent, or Firm* — Nixon & Vanderhye

(57) ABSTRACT

A flow meter includes two parts, a flow unit which can be fitted between fluid pipes and a detection unit snapped on the flow unit. The flow unit has a housing which accommodates a measuring chamber in which there is a rotating measuring ball. The detection unit is snapped on the measuring chamber and has a C-shaped housing part. Inside the housing part there is a printed circuit board which is also C-shaped and is present at a distance from the inner wall of the housing part. When the detection unit is snapped on the measuring chamber, the ends of the housing part will be bent outward. As a result of the clearance between the inner wall of the housing part and the printed circuit board and the fact that the housing part is slidable relative to the printed circuit board, the printed circuit board is not bent.

20 Claims, 3 Drawing Sheets

(58) Field of Classification Search
USPC .......................................................... 73/255
See application file for complete search history.

(56) References Cited

U.S. PATENT DOCUMENTS 5,337,615 A     8/1994   Goss
2012/0090472 A1*   4/2012   Etter ..................... G01F 15/075
                                                                                                  99/275

FOREIGN PATENT DOCUMENTS

EP           0 172 451 A2    2/1986
WO    WO 2008-105331    *   2/2007
WO        2015/065187 A1    5/2015

* cited by examiner

DETECTION UNIT FOR A ROTATING MEASURING BALL, AS WELL AS FLOWMETER

FIELD OF THE INVENTION

The invention relates to a detection unit for detecting passages of a measuring ball rotating in a measuring chamber of a flow unit, comprised of a housing containing detection means and a planar printed circuit board carrying electronic components. The detection means may be optical, magnetic or inductive detection means.

STATE OF THE ART

A detection unit of this type is known from EP 0 172 451 A. This known detection unit may be fitted to the outer wall of a flow unit. This detection unit is provided with connecting options for the power supply and for data transfer.

SUMMARY OF THE INVENTION

It is an object of the invention to provide a detection unit of the type defined in the opening paragraph which can be fitted to a flow unit in a simple manner. For this purpose the detection unit according to the invention is characterized in that the housing comprises a C-shaped housing part having an inward-facing inner wall, an outward-facing outer wall, and two end walls which at ends of the housing part connect the inner wall and outer wall together, where the distance between the inner wall and a line of symmetry of the housing part from one of the ends first increases and then decreases, and where the printed circuit board is C-shaped and between the walls a component space is situated in which the printed circuit board is present, which printed circuit board is provided with an inside edge and an outside edge, where the inside edge is present at a distance from the inner wall of the housing part, which distance has such a value that when the detection unit is snapped on the flow unit the inner wall of the outward-bending housing part does not come into contact with the inside edge of the printed circuit board. An advantage of this construction is that the housing part can be snapped on the outer wall of the measuring chamber of the flow unit without any deformation of the printed circuit board present inside the housing part. At the same time it is avoided that the housing comes into contact with the detection means (for example light source and photocell) as a result of which these detection means could be damaged or as a result of which its proper position and/or setting could be disturbed so that they are no longer in one line. Needless to observe that the openings in the housing at the detection means are to be sufficiently large and the detection means must not project too far from the printed circuit board so as to avoid them touching the housing or the flow unit. In consequence, it is not necessary to pose requirements to the printed circuit board as regards the elasticity, and a standard printed circuit board of customary material will suffice. The distance between the inside edge of the printed circuit board and the inner wall of the housing part is preferably larger than or equal to the difference between the maximum distance between the inner wall and the line of symmetry and the distance between the inner wall and the line of symmetry at one of the ends, so that it is warranted that the housing part cannot touch the printed circuit board when the detection unit is snapped on the flow unit.

Furthermore, because of the opening between the ends of the C-shaped housing part, the measuring chamber in which the measuring ball is rotating is visible. In the event of a possible disruption it may be established at once whether the measuring ball is rotating or not, so that the disruption may be traced down and eliminated in a faster and purpose oriented manner. When the flow meter is utilized in, for example, pharmacy, the foods sector and hospitals, the flow unit is replaced after a specified time owing to an excessive growth of bacteria for which a maximum has been stipulated. Since the detection unit can be removed from the flow meter in a fast and simple manner and afterwards refitted to a new flow meter in a fast and simple manner, the detection unit may be continued to be used. The detection unit containing the electronics does not come into contact with the fluid and, as a result, does not become polluted by the fluid so that re-use is possible.

An embodiment of the detection unit according to the invention is characterized in that the housing part is circular and interrupted at one spot. As a result, the detection unit can be snapped on the flow meter in any desired position. In consequence of this, the detection unit can be rotated around the flow meter. This allows for the detection unit to be put in the position in which the electrical cables can be connected to the detection unit in a simple manner.

A further embodiment of the detection unit according to the invention is characterized in that the housing part is further comprised of an upper wall and a lower wall and is provided with a plane that extends midway between and parallel to the upper wall and lower wall, and in that the housing includes an upper lip fitted to the upper wall (inlet section) of the housing part and extends in an upward sloping manner at an angle to the plane of symmetry in a direction toward the middle, as well as a lower lip which is fitted to the lower wall (outlet section) of the housing part and extends parallel to the plane of symmetry in a direction toward the middle. This may provide that the detection unit can be snapped on the flow unit in only one position and that this is also immediately clear to a mechanic due to the sloping and right-angled surface.

A still further embodiment of the detection unit according to the invention is characterized in that the printed circuit board near the middle of the C-shape is provided with a connecting part projecting outward, where the printed circuit board at the connection of the connecting part to the C-shaped part is enclosed in the housing in which it snugly fits or has a slight clearance. The arcs of the C-shaped part are present in the housing while having more clearance. As a result, the housing may bend while the position and state of the printed circuit board relative to the housing continues to be well defined.

The printed circuit board preferably has two fitting holes and on an inside (lower wall or upper wall) of the housing part two dowel pins are present projecting through the fitting holes. In addition to the above-mentioned fit of the printed circuit board in the housing, these fitting holes and dowel pins embody an additional measure for obtaining a proper positioning of the printed circuit board in the housing.

The invention also relates to a flow meter comprising a flow unit and a detection unit according to the invention, which flow unit includes a further housing which is provided with an inlet section and an outlet section and a middle section in between provided with a flow guide, which converts a flow in axial direction into a circulating flow, and a measuring chamber connected to the flow guide, which chamber accommodates a measuring ball rotating during operation as a result of the flow of the fluid in the measuring chamber, the measuring chamber being provided with an outer wall on which the detection unit is snapped. The outer wall of the measuring chamber is preferably cylindrical, so that the detection unit can be rotated around the measuring chamber in a simple manner.

An embodiment of the flow meter according to the invention is characterized in that the middle section of the further housing is provided with a top side which slopingly connects to the outer wall of the inlet section and projects radially, and a bottom side which forms a right-angled connection to the outer wall of the outlet section and projects radially, and where the upper lip and lower lip of the detection unit abut the top side or bottom side, respectively.

BRIEF DESCRIPTION OF THE DRAWINGS

The invention will be described below in more detail based on an example of embodiment of the flow meter provided with a detection unit according to the invention shown in the drawing figures, in which.

DETAILED DESCRIPTION OF THE DRAWINGS

Figure 1:
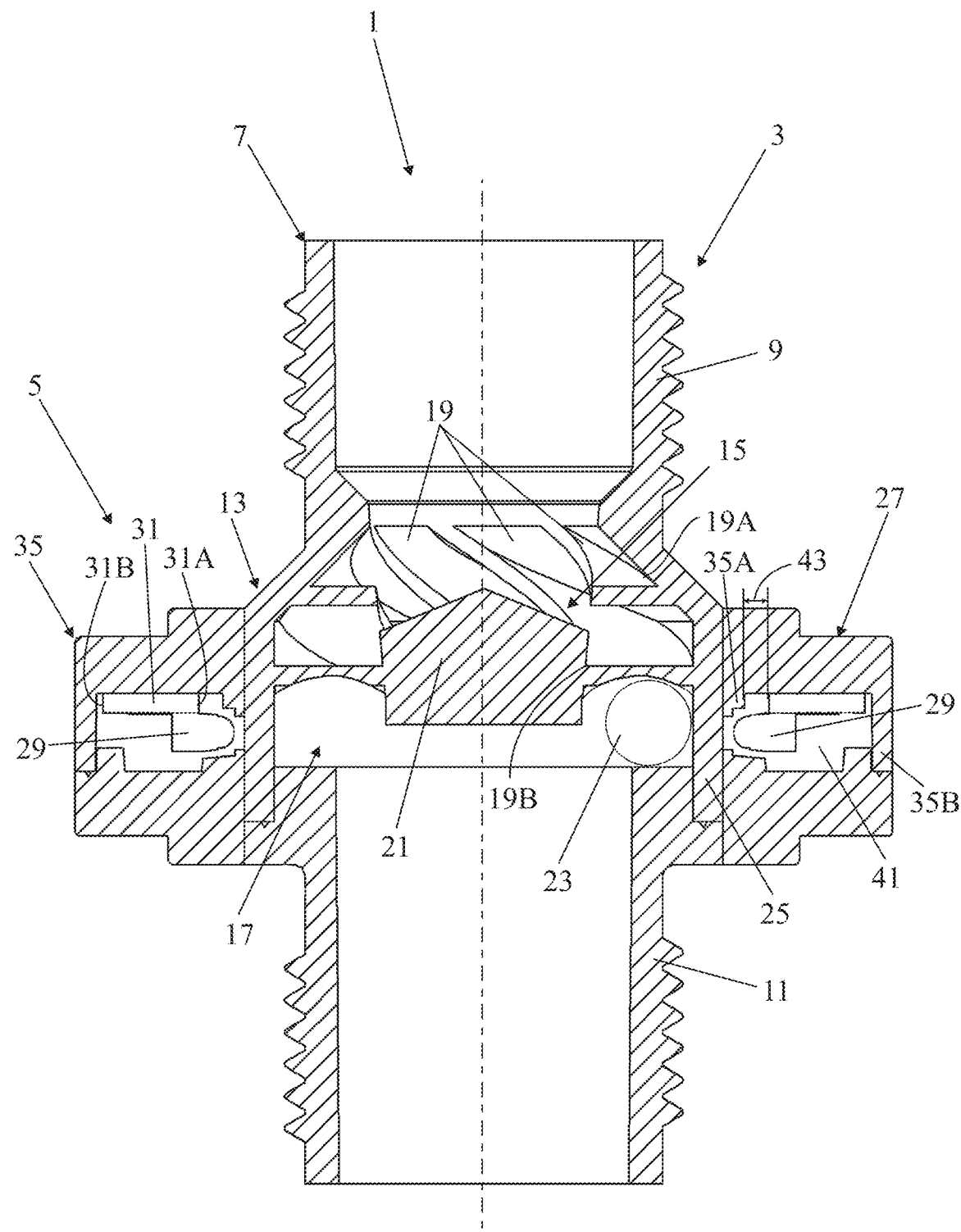
FIG. 1 shows a longitudinal sectional view of an embodiment of the flow meter.

FIG. 1 shows an embodiment of the flow meter according to the invention in a longitudinal sectional view. The flow meter 1 is comprised of two portions, that is to say, a flow unit 3 which may be inserted between fluid pipes and a detection unit 5 snapped on the flow unit. The flow unit comprises a housing 7 and has an inlet section 9 and an outlet section 11, as well as a widened middle section 13 present in between. This middle section comprises a guide portion 15 connecting to the inlet section and a measuring chamber 17 connecting to the guide portion and the outlet section. Inside the guide portion there are six helical guide blades 19 whose outside edges 19A are attached to the housing. Within these guide blades is present a core 21 which is connected to the inside edges 19B of the bottom-most parts of the guide blades. A measuring ball 23 is situated in the measuring chamber.

During operation fluid flows from the inlet section 9 via the guide portion 15, where the fluid is caused to rotate due to the helical guide blades 19, into the measuring chamber 17 where the measuring ball 23 is caused to rotate, and then leaves via the outlet section 11. The rotational speed of the measuring ball is a measure for the flow rate of the fluid.

Figure 2:
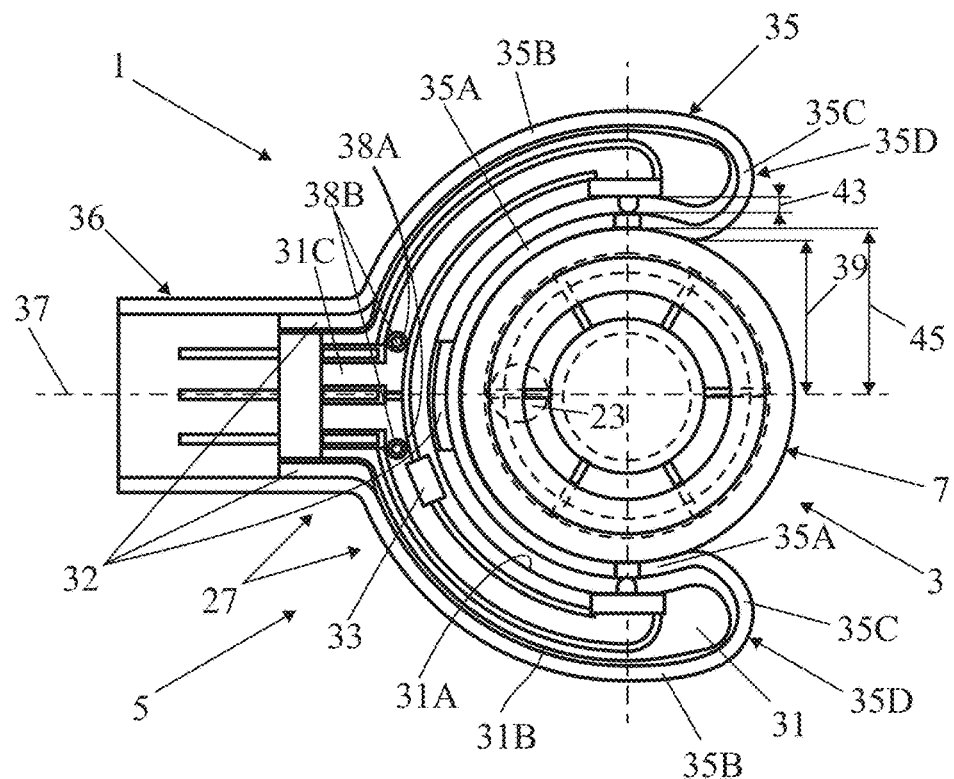
FIG. 2 shows a cross-sectional view of the flow meter.

An outside of the measuring chamber 17 is bounded by a circle cylindrical outer wall 25 which forms part of the housing 7. The detection unit 5 is snapped on this outer wall. The detection unit 5 has a housing 27 accommodating detection means 29 and a planar printed circuit board 31 to which electronic components 33 are fitted. This housing 27 comprises a C-shaped housing part 35 and a joining connecting part 36 (cf. FIG. 2). The housing part has an inner wall 35A, an outer wall 35B, and two end walls 35C which at the ends 35D of the housing part connect the inner and outer walls together.

The C-shape is a circle interrupted at one spot. A line of symmetry 37 divides the C-shaped housing part 35 in two equal portions, each portion having the shape of a half C. A sectional view of the housing part is mirror symmetrical relative to the line of symmetry 37. The distance 39, 45 between the inner wall 35A of the housing part and the line of symmetry 37 initially increases from the end 35D onward and then decreases.

The housing part 35 has a component room 41 in which the printed circuit board 31 is located. The printed circuit board extends in a flat straight plane and also has a C-shape and is provided with an inside edge 31A and an outside edge 31B. Near the middle of the C-shape the printed circuit board is provided with an outward projecting connecting part 31C. At the connection of the connecting part to the C-shaped part the printed circuit board is enclosed in mating manner or with a slight clearance between protrusions 32 situated on the inside of the housing. In a direction perpendicular to the plane of the printed circuit board the printed circuit board is locked between an upper wall on one hand and a plurality of ribs situated on the lower wall and projecting upward.

Supplementary to the above-mentioned printed circuit board's fit in the housing for a correct positioning of the printed circuit board, two fitting holes 38A are provided in the printed circuit board and two dowel pins 38B projecting through the fitting holes are present on the bottom of the housing.

The inside edge 31A of the C-shaped part of the printed circuit board is located at a distance 43 from the inner wall 35A of the housing part. This distance 43 is larger than or equals the difference between the maximum distance 45 between the inner wall 35A and the line of symmetry 37 and the distance 39 between the inner wall and the line of symmetry at the end. This difference is the maximum distance that is bent by each of the ends 35D of the housing 7 while the detection unit 5 is being snapped on the housing 7 of the flow unit 3. The distance 43 is either greater than or equal to half the difference between the maximum distance between parts of the inner wall 35A facing each other (twice the distance 45) and the distance between parts of the inner wall facing each other at the ends 35D (twice the distance 39). When the detection unit 5 is snapped on the measuring chamber 17, the ends 35D of the housing part will be bent outward. As a result of the clearance (distance 43) between the inner wall of the housing part and the printed circuit board and the fact that the housing part is slidable relative to the printed circuit board, the printed circuit board is not bent.

Figure 3:
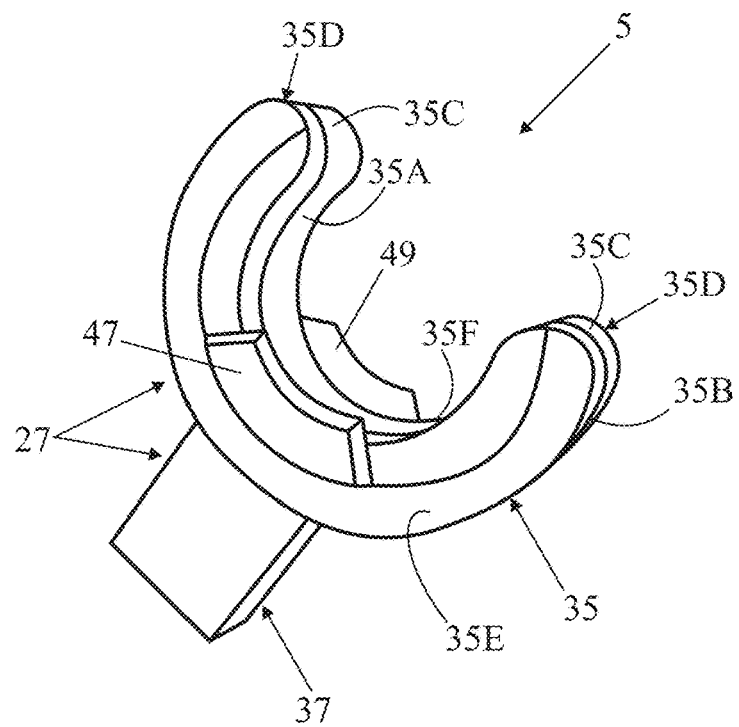
FIG. 3 shows a perspective view of the detection unit.
Figure 4:
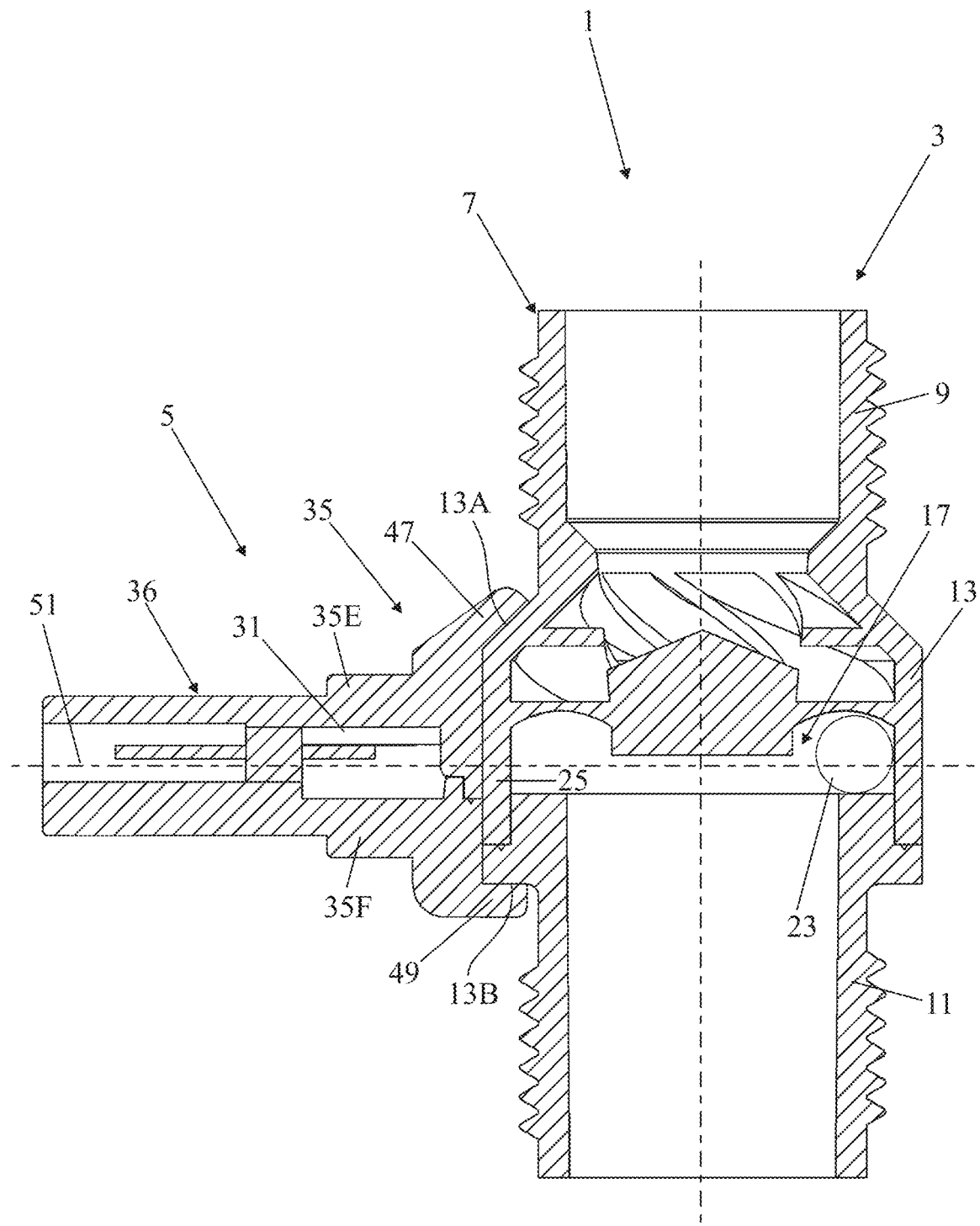
FIG. 4 shows a longitudinal sectional view perpendicular to the sectional view of the flow meter shown in FIG. 1.

The housing part 35 of the detection unit further includes an upper wall 35E and a lower wall 35F (cf. FIGS. 3 and 4). An upper lip 47 is fitted to the upper wall and a lower lip 49 is fitted to the lower wall. The middle section 13 of the flow unit 3 has a top side 13A connected at an angle to the outer wall of the inlet section 9 and projecting outward, and a bottom side 13B connected perpendicularly to the outer wall of the outlet section and projecting radially. The upper lip and lower lip of the detection unit abut the top side or bottom side respectively of the further housing. The angles formed on one hand by the top side and the upper lip and on the other by the bottom side and the lower lip relative to a surface 51 (cf. FIG. 4), extending midway between and parallel to the upper and lower wall, are different, so that the detection unit can be snapped in only one position on the middle section.

Albeit the invention has been described in the foregoing based on the drawings, it should be established that the invention is not by any manner or means restricted to the embodiment shown in the drawings. The invention also extends to all embodiments deviating from the embodiment shown in the drawings within the scope defined by the claims.

The invention claimed is:

1. A detection unit (5) for detecting passages of a measuring ball (23) rotating in a measuring chamber (17) of a flow unit (3), the detection unit comprised of a housing (27) containing detection means (29) and a planar printed circuit board (31) carrying electronic components (33), wherein the housing (27) comprises a C-shaped housing part (35) having an inward-facing inner wall (35A), an outward-facing outer wall (35B), and two end walls (35C) which at ends of the housing part connect the inner wall and outer wall together, where a distance (39, 45) between the inner wall (35A) and a line of symmetry (37) of the housing part initially increases from one of the ends (35D) onward and then decreases, and where the printed circuit board (31) is C-shaped and between the inner and outer walls a component space (41) is situated in which the printed circuit board is present, which printed circuit board is provided with an inside edge (31A) and an outside edge (31B), where the inside edge (31A) is present at a distance (43) from the inner wall (35A) of the housing part, which distance has such a value that when the detection unit (5) is snapped on the flow unit (3) the inner wall (35A) of the C-shaped housing part (35) does not come into contact with the inside edge (31A) of the printed circuit board (31).

2. The detection unit as claimed in claim 1, wherein the distance (43) between the inside edge (31A) of the printed circuit board (31) and the inner wall (35) of the housing part (35) is larger than or equal to a difference between a maximum distance (45) between the inner wall (35A) and the line of symmetry (37) and a distance (39) between the inner wall (35A) and the line of symmetry (37) at one of the ends (35D).

3. The detection unit as claimed in claim 2, wherein the housing part is circular and interrupted at one spot.

4. The detection unit as claimed in claim 2, wherein a housing part (35) is further comprised of an upper wall (35E) and a lower wall (35F) and is provided with a plane (51) that extends midway between and parallel to the upper wall and lower wall, and wherein the housing includes an upper lip (47) fitted to the upper wall of the housing part and extends in an upward sloping manner at an angle to a plane of symmetry in a direction toward a middle, as well as a lower lip (49) which is fitted to the lower wall of the housing part and extends parallel to the plane of symmetry in a direction toward the middle.

5. The detection unit as claimed in claim 2, wherein the printed circuit board (31) has two fitting holes (38A) and on an inside of the housing part (35) two dowel pins (38B) are present projecting through the fitting holes.

6. The detection unit as claimed in claim 2, wherein the printed circuit board (31) near a middle of the C-shape is provided with a connecting part (31C) projecting outward, where the printed circuit board, at a connection of the connecting part to the C-shaped housing part, is enclosed in a housing in which it snugly fits or has a slight clearance.

7. The detection unit as claimed in claim 1, wherein the housing part (35) is circular and interrupted at one spot.

8. The detection unit as claimed in claim 7, wherein a housing part (35) is further comprised of an upper wall (35E) and a lower wall (35F) and is provided with a plane (51) that extends midway between and parallel to the upper wall and lower wall, and wherein the housing includes an upper lip (47) fitted to the upper wall of the housing part and extends in an upward sloping manner at an angle to a plane of symmetry in a direction toward a middle, as well as a lower lip (49) which is fitted to the lower wall of the housing part and extends parallel to the plane of symmetry in a direction toward the middle.

9. The detection unit as claimed in claim 7, wherein the printed circuit board (31) has two fitting holes (38A) and on an inside of the housing part (35) two dowel pins (38B) are present projecting through the fitting holes.

10. The detection unit as claimed in claim 7, wherein the printed circuit board (31) near a middle of the C-shape is provided with a connecting part (31C) projecting outward, where the printed circuit board, at a connection of the connecting part to the C-shaped housing part, is enclosed in a housing in which it snugly fits or has a slight clearance.

11. The detection unit as claimed in claim 1, wherein a housing part (35) is further comprised of an upper wall (35E) and a lower wall (35F) and is provided with a plane (51) that extends midway between and parallel to the upper wall and lower wall, and wherein the housing includes an upper lip (47) fitted to the upper wall of the housing part and extends in an upward sloping manner at an angle to a plane of symmetry in a direction toward a middle, as well as a lower lip (49) which is fitted to the lower wall of the housing part and extends parallel to the plane of symmetry in a direction toward the middle.

12. The detection unit as claimed in claim 11, wherein the printed circuit board (31) has two fitting holes (38A) and on an inside of the housing part (35) two dowel pins (38B) are present projecting through the fitting holes.

13. The detection unit as claimed in claim 11, wherein the printed circuit board (31) near a middle of the C-shape is provided with a connecting part (31C) projecting outward, where the printed circuit board, at a connection of the connecting part to the C-shaped housing part, is enclosed in a housing in which it snugly fits or has a slight clearance.

14. The detection unit as claimed in claim 1, wherein the printed circuit board (31) has two fitting holes (38A) and on an inside of the housing part (35) two dowel pins (38B) are present projecting through the fitting holes.

15. The detection unit as claimed in claim 14, wherein the printed circuit board (31) near a middle of the C-shape is provided with a connecting part (31C) projecting outward, where the printed circuit board, at a connection of the connecting part to the C-shaped housing part, is enclosed in a housing in which it snugly fits or has a slight clearance.

16. The detection unit as claimed in claim 1, wherein the printed circuit board (31) near a middle of the C-shape is provided with a connecting part (31C) projecting outward, where the printed circuit board, at a connection of the connecting part to the C-shaped housing part, is enclosed in a housing in which it snugly fits or has a slight clearance.

17. A flow meter (1) comprising the detection unit (5) as claimed in claim 16 and the flow unit (3) comprising the measuring chamber (17) accommodating the measuring ball (23),
wherein the flow unit includes a further housing (7) which is provided with an inlet section (9) and an outlet section (11) and a middle section (13) in between provided with a flow guide (15), which converts a flow in axial direction into a circulating flow,
the measuring chamber (17) is connected to the flow guide, and
wherein the measuring chamber (17) accommodates the measuring ball (23) rotating during operation as a result of the flow of the fluid in the measuring chamber, the measuring chamber being provided with an outer wall (25) on which the detection unit (5) is snapped.

18. The flow meter as claimed in claim 17, wherein the middle section (13) of the further housing (7) is provided with a top side (13A) which slopes and connects to an outer wall of the inlet section (9) and projects radially, and a bottom side (13B) which forms a right-angled connection to the outer wall of the outlet section (11) and projects radially, and the upper lip (47) and lower lip (49) of the detection unit abut the top side or bottom side, respectively.

19. The flow meter as claimed in claim 17, wherein the outer wall (25) of the measuring chamber (17) is cylindrical.

20. A flow meter (1) comprising the detection unit (5) as claimed in claim 1 and the flow unit (3) comprising the measuring chamber (17) accommodating the measuring ball (23), wherein the flow unit includes a further housing (7) which is provided with an inlet section (9) and an outlet section (11) and a middle section (13) in between provided with a flow guide (15), which converts a flow in axial direction into a circulating flow, the measuring chamber (17) is connected to the flow guide, and wherein the measuring chamber (17) accommodates the measuring ball (23) rotating during operation as a result of the flow of the fluid in the measuring chamber, the measuring chamber being provided with an outer wall (25) on which the detection unit (5) is snapped.

\* \* \* \* \*